United States Patent [19]

Serizawa et al.

[11] Patent Number: 5,349,007
[45] Date of Patent: Sep. 20, 1994

[54] LIGHTWEIGHT THERMOPLASTIC POLYESTER MOLDING COMPOSITIONS, METHODS OF MAKING THE SAME AND MOLDED ARTICLES FORMED THEREOF

[75] Inventors: Hajime Serizawa; Masaru Kubota; Hiroyuki Sano; Yoshihisa Tajima, all of Shizuoka, Japan

[73] Assignees: Polyplastics Co., Ltd.; Takeda Chemical Industries, Ltd., both of Osaka, Japan

[21] Appl. No.: 84,439

[22] Filed: Jul. 1, 1993

Related U.S. Application Data

[63] Continuation of Ser. No. 813,270, Dec. 24, 1991, abandoned.

[30] Foreign Application Priority Data

Dec. 26, 1990 [JP] Japan .................................. 2-406692

[51] Int. Cl.$^5$ ........................ C08L 23/02; C08L 67/02
[52] U.S. Cl. ...................................... 524/513; 525/64; 525/167; 525/173; 525/174; 525/177
[58] Field of Search ................ 525/177, 64, 167, 173, 525/174; 524/513

[56] References Cited

U.S. PATENT DOCUMENTS 4,594,388 6/1986 Arai .
5,026,776 6/1991 Pratt ...................................... 525/64

FOREIGN PATENT DOCUMENTS 0285256 10/1988 European Pat. Off. .
0400890A3 12/1990 European Pat. Off. .
60-040154 3/1985 Japan .
8604076 7/1986 PCT Int'l Appl. .

OTHER PUBLICATIONS

Database STN vol. 113, No. 24, Dec. 10, 1990, abstract No. 213335b; & JP-A-02167361 (Copolymer Rubber and Chemical Corp.) Jun. 27, 1990.
Patent Abstracts of Japan, vol. 10, No. 226 (C-364)(2282), Aug. 7, 1986; & JP-A-61160744 (Sumitomo Chem. Co. Ltd.) Aug. 31, 1984.

*Primary Examiner*—Patricia A. Short
*Attorney, Agent, or Firm*—Nixon & Vanderhye

[57] ABSTRACT

Lightweight polyester resin molding compositions include a melt-blend of (A) between 97 to 20 parts by weight, based on 100 parts by weight of the total composition weight, of a polyester base resin, (B) between 3 to 80 parts by weight, based on 100 parts by weight of the total composition weight, of a polyolefin resin, (C) between 0.1 to 15 parts by weight, based on 100 parts by weight of the total composition weight, of a compatibilizing compound having a carbon-carbon double bond and an epoxy group in its molecule, (D) between 0.1 to 20% by weight, based on the weight of the compatibilizing compound, of a free radical initiator, and optionally, (E) up to 120 parts by weight, based on 100 parts by weight of the total composition, of a filler material. The free radical initiator is at least one compound having a one-minute half-life temperature of 130° C. or greater, and is preferably pre-blended in solution form with the compatibilizing compound prior to being added to a melt of the polyester base resin and polyolefin resin. The resulting compositions may be molded to form relatively lightweight articles having minimal (if any) propensity to surface peel.

16 Claims, No Drawings

LIGHTWEIGHT THERMOPLASTIC POLYESTER MOLDING COMPOSITIONS, METHODS OF MAKING THE SAME AND MOLDED ARTICLES FORMED THEREOF

This is a continuation of application Ser. No. 07/813,270, filed Dec. 24, 1991, now abandoned.

FIELD OF INVENTION

The present invention generally relates to thermoplastic polyester molding compositions, methods of making such compositions, and molded articles formed thereof. More specifically, the thermoplastic polyester molding compositions of the present invention are especially characterized by having reduced specific gravity (and hence lighter weight) as compared to the polyester base resin, while maintaining the desirable mechanical properties and surface conditions which are attributable to the polyester base resin.

BACKGROUND AND SUMMARY OF THE INVENTION

Thermoplastic polyesters such as polyethylene terephthalate (PET) and polybutylene terephthalate (PBT), are well known engineering resins and are used extensively to form a variety of molded articles due to their favorable mechanical, physical and chemical properties. Thus, molded articles formed of polyester resins have been employed as component parts for automobiles, electric and electronic apparatus, tools, and precision machines.

Recently, there has been a need to reduce the weight of many apparatus and machines which include components formed of molded polyester resins. For example, the weight of automobiles has been desired as one means to reduce fuel consumption. Furthermore, in the electric and electronics appliance industries, weight reduction is a desirable objection so as to facilitate greater ease of handling of the apparatus as a whole (e.g., so as to make the apparatus more easily transported by the consumer).

Attempts have been made to reduce the weight of apparatus generally by using lighter weight (lower specific gravity) component parts without sacrificing the functions and/or properties that are needed. A possible technique for reducing the weight of molded parts formed of thermoplastic polyester resin involves incorporating into the polyester base resin, a polyolefin resin having a lesser specific gravity. However, since polyester and polyolefin resins form an incompatible blend, surface peeling is often observed on molded articles due to insufficient dispersion of the polyolefin throughout the polyester base resin thereby deleteriously affecting the articles' impact strength. As a practical matter, therefore, a commercially viable polyester molding composition cannot be obtained simply by melt-blending a polyolefin resin with a polyester base resin.

There have, however, been attempts to improve the incompatibility of polyester and polyolefin resins, as disclosed, for example, in Japanese Patent Publication Nos. 60744/1986 and 60756/1986. In the former, a technique is disclosed whereby a copolymer of an epoxidized ethylene or ethylenically unsaturated compound is used as a compatibilizing agent. In the latter, a technique is disclosed whereby a modified polypropylene is used in addition to the copolymer of an epoxidized ethylene or ethylenically unsaturated compound so as to improve compatibility with polyester resins.

Notwithstanding these prior proposals, there still exists a need for improved and compatible blends of polyester and polyolefin resins so that more lightweight polyester resin compositions, and molded parts thereof, may be produced. It is towards fulfilling such a need that the present invention is directed.

Broadly, the present invention principally resides in the discovery that the compatibility of thermoplastic polyester and polyolefin resins can be significantly improved by incorporating a compatibilizing compound having both a carbon-carbon double bond and an epoxy group in its molecule, and by melt-blending the components in the presence of a radial initiator.

More specifically, the present invention relates to a moldable thermoplastic polyester resin composition which includes:

(A) between 97 to 20 parts by weight (based on 100 parts by weight of the compositions) of a polyester base resin;

(B) between 3 to 80 parts by weight (based on 100 parts by weight of the composition) of a polyolefin resin;

(C) between 0.1 to 15 parts by weight (based on 100 parts by weight of the composition) of a compatibilizing compound having both a carbon-carbon double bond and an epoxy group in its molecular structure; and (D) between 0.1 to 20 % by weight of the compatibilizing compound, of a free radical initiator.

These components are preferably melt-blended in the presence of the free radical initiator for a time period of at least 30 seconds. Optionally, the compositions of this invention may further be blended with (E) up to 120 parts by weight (based on 100 parts by weight of the composition) of at least one filler material (in the form of solid or hollow fibers, powders, flakes or the like).

Further aspects and advantages of this invention will become more clear after careful consideration is given to the detailed description of the preferred exemplary embodiments thereof which follows.

DETAILED DESCRIPTION OF THE PREFERRED EXEMPLARY EMBODIMENTS

The polyester base resin that is a necessary component in the compositions of the present invention may be either a homopolyester or a copolyester obtained by the polycondensation of (1) one or more dicarboxylic acids such as terephthalic, isophthalic, naphthalenedicarboxylic, 4,4'-diphenyldicarboxylic and diphenyl ether dicarboxylic acids, $\alpha,\beta$-bis(4-carboxyphenoxy)ethane, adipic, sebacic, azelaic, decanedicarboxylic, dodencanedicarboxylic, cyclohexanedicarboxylic and dimer acids and their ester-forming derivatives, and (2) one or more glycols selected from ethylene glycol, propylene glycol, butanediol, pentanediol, neopentyl glycol, hexanediol, octanediol, decanediol, cyclohexanedimethanol, hydroquinone, bisphenol A, 2,2-bis(4'-hydroxyetoxyphenyl)propane, xylene glycol, polyethylene ether glycol, polytetramethylene ether glycol and aliphatic polyester oligomers having hydroxyl groups at both ends thereof.

The comonomers that may be used to form copolyesters include, in addition to those described above, hydroxy carboxylic acids such as glycolic, hydroxy, hydroxybenzoic, hydroxyphenylacetic and naphthylglycolic acids; and lactone compounds such as propiolactone, butyrolactone, caprolactone. The polyester base resin can also have a branched or crosslinked structure formed by using a polyfunctional ester-forming component such as trimethylolpropane, trimethylolethane, pentaerythritol, trimellitic acid, trimesic acid or pyromellitic acid so far as the thermoplastic properties thereof can be retained.

The polyester base resin may also be or include one or more halogenated polyester copolymers produced from a compound having a halogen-substituted aromatic nucleus and an ester-forming group, such as dibromoterephthalic acid, tetrabromoterephthalic acid, tetrachloroterephthalic acid, 1,4-dimethyloltetrabromobenzene, tetra-bromobisphenol A and ethylene and propylene oxide adducts of tetrabromobisphenol A.

Polyester elastomers comprised of a block copolymer of a high-melting hard segment and a low-melting soft segment are also usable. Examples of such polyester elastomers include, for example, a block copolymer of a hard segment mainly comprising alkylene terephthalate units and a soft segment comprising an aliphatic polyester or polyether.

The polyester base resin can be either one of the above-described resins, or a mixture of two or more of the same. Particularly preferred polyester resins are polyethylene terephthalate, polybutylene terephthalate and copolymers mainly comprised of polyethylene terephthalate or polybutylene terephthalate units. Particularly preferred comonomer components which may constitute the copolymer include isophthalic acid, bisphenol A, 2,2-bis($\beta$-hydroxyethoxyphenyl)propane and 2,2-bis($\beta$-hydroxyethoxytetrabromophenyl)propane.

The polyolefin resin component that can be used in the compositions of the present invention include polyethylene, polypropylene, polymethylpentene, polybutylene, as well as copolymers mainly comprising such polyolefin units, such as ethylene/propylene copolymers, ethylene/propylene/diene copolymers and copolymers comprised of monomers other than olefins. These polyolefin resins can be used either alone or in the form of a mixture of two or more of the same. When a polyolefin elastomer, such as an ethylene/propylene copolymer or an ethylene/propylene/diene copolymer is used, particularly significant effects in terms of improving the tenacity of the resin composition is obtained.

The amount of the polyolefin resin component will vary depending on the intended properties and end-use application. Preferably, however, the polyolefin will be present in an amount between 3 to 80 parts by weight per 97 to 20 parts by weight of the polyester base resin. Although relatively large amounts of the polyolefin resin are desirably incorporated into the polyester base resin when a composition having a low specific gravity is to be produced, the heat distortion temperature of the composition is unfavorably lowered when the amount of the polyolefin resin exceeds 80 parts by weight. When improvements in the tenacity of the resin composition is the principal intent, it is then preferred to incorporate a relatively small amount, for example, at least 3 parts by weight, particularly at least 5 parts by weight, of the polyolefin resin into the polyester base resin.

The compositions of the present invention are especially characterized by the presence of a compatibilizing compound having a carbon-carbon double bond and an epoxy group in its molecule, such as an epoxidized vinyl or allyl compound. Preferred compatibilizing compounds include those which are not easily volitilized during melt-blending at temperatures in excess of 150° C., such as allyl glycidyl ethers, glycidyl acrylates, glycidyl methacrylates, glycidyl vinylbenzoates, glycidyl allybenzoates, N-[4-(2,3-epoxypropoxy)-3,5-dimethylbenzyl]acrylamides, N-diallylaminoepoxypropanes, epoxyhexenes, esters of epoxidized stearyl alcohol with acrylic or methacrylic acid, glycidyl cinnamates, glycidyl cinnamylideneacetates and chalcone glycidyl ethers. Among them, particularly preferred are glycidyl methacrylates, glycidyl vinylacetates, alycidyl allylbenzoates, N-[4-(2,3-epoxypropoxy)-3,5-dimethylbenzyl]acrylamides and N-dialylaminoepoxypropanes.

The amount of the compatibilizing component which is incorporated into the polyester base resin is between 0.1 to 15 parts by weight of the total of the polyester base resin and the polyolefin resin component. The amount of the compatibilizing component, however, will vary depending on the specific compound used and/or the intended end-use application of the composition. Insufficient amounts of the compatibilizing component will, however, have little effect upon improving the compatibility of the polyester base resin and the polyolefin resin. As a result, surface peeling on molded articles is likely to occur. On the other hand, when excessive amounts, the melt viscosity of the composition is excessively increased thereby inhibiting the molding process and/or causing the compatibilizing component to "bleed" from the composition.

It is particularly preferred to incorporate a radical initiator into the compositions of this invention. The radical initiators that may be used are not particularly limited, provided that they form a free radical. Thus, virtually any known radical initiator may be used. The preferred radical initiators are those having a one-minute half-like temperature of 130° C. or above, particularly 150° C. or above. Specific examples of preferred radical initiators include dicumyl peroxide, t-butyl cumyl peroxide, 2,5-dimethylhexane 2,5-dihydroperoxide, di-t-butyl peroxide, t-butyl cumyl peroxide, 2,5-dimethyl-2,5-di(t-butylperoxy)hexane, 2,5-dimethyl-2,5-di(t-butylperoxy)hexyne-3, n-butyl 4,4-bis (t-butylperoxy)valerate, 2,3-diethyl-2,3-diphenylbutane, 2,3-dimethyl-2,3-diphenylbutane 2,3-dimethyl-2,3-di(P-methylphenyl)bulane and 2,3-dimethyl-2,3-di(bromophenyl)butane. The radical initiators can be used either alone or in the form of a combination of two or more.

The radical initiator component is present in the compositions of this invention between 0.1 to 20% by weight, preferably between 0.3 to 10% by weight, based on the component (C). The amount of the radical initiator that is added varies depending on the specific initiator compound used and the intended end-use of the composition to be produced. Insufficient amounts of the initiator will result in minimal (if any) improvements in terms of compatibilizing the polyester base resin and the polyolefin resin. As a result, surface peeling on molded articles is likely to occur. On the other hand, excessive amounts of the initiator could be a disadvantage in terms of causing "bubbling" to occur during melt-blending and/or molding.

Although the exact mechanism that results by incorporating in a polyester base resin both a compatibilizing compound of the type having a carbon-carbon double bond and an epoxy group in its molecular structure, and a free radical initiator is not fully understood at this time, it is believed (without wishing to be bound to any particular theory) that the polyolefin component becomes chemically bonded to the polyester base resin through the compatibilizing compound. As a result, the polyolefin resin is homogenously dispersed throughout the polyester base resin thereby inhibiting surface peeling on molded articles formed of the resin composition.

Although the filler material that is optionally used in the compositions of the present invention is not indispensable it is preferably used in order to obtain molded articles having enhanced properties such as mechanical strength, thermal resistance, dimensional stability and electric properties. A fibrous, powdery, flaky or hollow filler may be used depending on the particular property enhancement that is desired.

Examples of fibrous filers include inorganic fibrous materials such as glass fibers, asbestos fibers, carbon fibers, silica fibers, silica/alumina fibers, zirconia fibers, boron nitride fibers, silicon nitride fibers, boron fibers, potassium titanate fibers and metal fibers such as stainless steel, aluminum, titanium, copper and brass fibers. Typical examples of the fibrous fillers are glass fibers and carbon fibers. High-boiling organic fibrous materials such as polyamides, fluororesins and acrylic resins are also usable.

Powdery fillers that may be used include carbon black, silica, silicates such as quartz powder, glass beads, glass powder, calcium silicate, aluminum silicate, kaolin, talc, clay, diatomaceous earth and wollastonite; metal oxides such as iron oxide, titanium oxide and alumina; metal carbonates such as calcium carbonate and magnesium carbonate; metal sulfates such as calcium sulfate and barium sulfate; as well as silicon carbide, silicon nitride, boron nitride and various metal powders. Flaky fillers include mica, glass flakes and metal foils, while hollow fillers include Shirasu balloons, metal balloons and glass balloons. The fillers are preferably surface-treated with an organic silane, organic borane or organic titanate, and can be used either alone or in the form of a combination of two or more of the same. The combination of a fibrous filler, particularly glass fibers or carbon fibers, with a granular or flaky filler is preferred in terms of obtaining excellent mechanical strength, dimensional accuracy and electrical properties.

The amount of the inorganic filler must not be greater than 120 parts by weight per 100 parts by weight of the total of the polyester base resin and polyolefin resin components. When the filler material is used in an excessive amount, the moldability and tenacity of the composition are unfavorably impaired. It is particularly preferred that the filler material be present in an amount not greater than 70 parts by weight.

The compositions of the present invention may further contain other thermoplastic resins such as polyvinyl chloride resin, polyvinylidene chloride resin, polycarbonate resin, polyamide resin, natural rubber or synthetic rubber, as well as flame retardants, antioxidants, ultraviolet screening agents, lubricants, mold-release agents, nucleating agents, foaming agents, crosslinking agents and colorants, provided that the benefits achieved by the necessary components are not attained.

The compositions of the present invention can be produced by virtually any process known in the art to effect melt-blending of components. In terms of the present invention, however, it is indispensable that the four necessary components—i.e., the polyester base resin, the polyolefin resin, the compatibilizing compound, and the free radical initiator—be heated and melt-blended for a time period of at least 30 seconds. The optional filler material and other components may be treated simultaneously with the necessary components or may be added separately during further downstream processing and/or molding. In particular, the components may homogeneously be mixed in a mixer, such as a tumbler or Henschel mixer, with the mixture then being fed into a single-screw or double-screw extruder where it is melt-kneaded therein so as to form pellets. It is especially preferred to prepare a solution of the compatibilizing component and the free radical initiator which is then added to a powdery mixture of the polyester base resin and polyolefin resin. This mixture is then dried and thereafter used as feed stock to a melt-blending apparatus. It is also particularly preferred that the free radical initiator be added in small increments in a solution state. The filler material may be added to the other components either during or after melt-blending.

The components are melt-blended at a temperature of 5° to 100° C. (preferably 10 to 60° C.) greater than the melting point of the resin components. When the melt-blending temperature is excessively high, the resin components may decompose and/or an abnormal reaction may be caused. The melt-blending time ranges from 30 seconds to 15 minutes, preferably 1 to 10 minutes.

It will thus be apparent from the above description and the following Examples that the polyester resin compositions of the present invention exhibit improved mechanical properties and are capable of forming lightweight molded articles having good appearances and being free from surface peeling effects.

EXAMPLES

The following nonlimiting Examples will further illustrate the present invention.

Examples 1 to 6 and Comparative Examples 1 to 4

35 parts by weight of polybutylene terephthalate resi (PBT) (Duranex 2000 mfd. by Polyplastics Co., Ltd.) was mixed with 65 parts by weight of polymethylpentene (PMP) (TPX RT18XB mfd, by Mitsui Petrochemical Industries, Ltd.). N-(4-(2,3-epoxypropoxy)-3,5-dimethylbenzyl) acrylamide(C-1) and a previously prepared 10% solution of 2,5-dimethyl-2,5-di(t-butylperoxy)hexane (D-1) in acetone were then added thereto in amounts specified in Table 1. After mixing the components, acetone was removed and, if necessary, glass fibers (chopped strands having a diameter of 10 μm and a length of 3 mm) were added thereto and premixed with a Henschel mixer for 5 min. The mixture was melt-headed within an extruder having a cylinder temperature of 260° C. (residence time of about 2 minutes) and shaped into pellets of the polyester resin composition.

ASTM test pieces were then prepared by molding with an injection molding machine at a cylinder temperature of 260° C. and a mold temperature of 60° C. and subjected to tensile and impact tests. The surface conditions of the tensile test pieces were visually observed to determine the presence or absence of surface peeling.

The results are summarized in Table 1 below.

TABLE 1

|  | Comp. Ex. 1 | Comp. Ex. 2 | Ex. 1 | Ex. 2 | Ex. 3 | Ex. 4 | Ex. 5 | Comp. Ex. 3 | Comp. Ex. 4 | Ex. 6 |
|---|---|---|---|---|---|---|---|---|---|---|
| Amount (pt. by wt.) | | | | | | | | | | |
| Compt. (A) PBT | 35 | 35 | 35 | 35 | 35 | 35 | 35 | 35 | 35 | 35 |
| Compt. (B) PMP | 65 | 65 | 65 | 65 | 65 | 65 | 65 | 65 | 65 | 65 |
| Compt. (C) C-1 | — | 2 | 0.5 | 2 | 10 | 2 | 2 | — | 2 | 2 |
| Compt. (D) D-1 (wt. % based on compt. (C)) | — | — | 0.5 | 0.5 | 0.5 | 5 | 10 | — | — | 0.5 |
| Compt. (E) glass fibers | — | — | — | — | — | — | — | 43 | 43 | 43 |
| Properties of compn. | | | | | | | | | | |
| tens. strength [kg/cm$^2$] | 280 | 281 | 290 | 300 | 360 | 340 | 355 | 780 | 785 | 800 |
| tens. elongn. [%] | 12 | 12 | 13 | 13 | 15 | 14 | 15 | 2.3 | 2.3 | 2.5 |
| Izod impact strength [kgcm/cm] notched | 1.2 | 1.2 | 1.4 | 1.6 | 1.9 | 1.7 | 1.8 | 6.5 | 6.5 | 7.0 |
| appearance of molding (peeling) | peeling | peeling | slight peeling | no peeling | no peeling | no peeling | no peeling | peeling | peeling | no peeling |

Examples 7 to 10 and Comparative Examples 5 to 8

The above-described PBT resin, PMP, C-1 and D-1 were blended in amounts specified in Table 2 and the same preparation and testing procedures as used in Examples 1 to 6 were repeated.

The results are summarized in Table 2 below.

TABLE 2

|  | Comp. Ex. 5 | Ex. 7 | Comp. Ex. 6 | Ex. 8 | Comp. Ex. 7 | Ex. 9 | Comp. Ex. 8 | Ex. 10 |
|---|---|---|---|---|---|---|---|---|
| Amount (pt. by wt.) | | | | | | | | |
| Compt. (A) PBT | 85 | 85 | 70 | 70 | 50 | 50 | 70 | 70 |
| Compt. (B) PMP | 15 | 15 | 30 | 30 | 50 | 50 | 30 | 30 |
| Compt. (C) C-1 | — | 2 | — | 2 | — | 2 | — | 2 |
| Compt. (D) D-1 (wt. % based on compt. (C)) | — | 0.5 | — | 0.5 | — | 0.5 | — | 0.5 |
| Compt. (E) glass fibers | — | — | — | — | — | — | 43 | 43 |
| Properties of compn. | | | | | | | | |
| tens. strength [kg/cm$^2$] | 305 | 330 | 300 | 320 | 290 | 310 | 1200 | 1250 |
| tens. elongn. [%] | 8.0 | 9.0 | 9.0 | 9.5 | 9.5 | 11 | 2.5 | 2.6 |
| Izod impact strength [kgcm/cm] notched | 1.1 | 1.4 | 1.3 | 1.5 | 1.4 | 1.6 | 9.0 | 9.3 |
| appearance of molding (peeling) | peeling | no peeling | peeling | no peeling | peeling | no peeling | peeling | no peeling |

Examples 11 to 15

The same procedures as used in Example 2 were repeated except that C-1 was replaced with glycidyl methacrylate (C-2) or N-diallylaminoepoxy propane (C-3) and that D-1 was replaced with 2,5-dimethyl-2,5-dt(t-butylperoxy)hexyne-3 (D-2), 2,3-dimethyl-2,3-diphenylbutane (D-3) or 2,5-dimethylhexane 2,5-dihydroperoxide (D-4).

The results are summarized in Table 3 below.

TABLE 3

|  | Comp. Ex. 1 | Ex. 11 | Ex. 12 | Ex. 13 | Ex. 14 | Ex. 15 |
|---|---|---|---|---|---|---|
| Amount (pt. by wt.) | | | | | | |
| Compt. (A) PBT | 35 | 35 | 35 | 35 | 35 | 35 |
| Compt. (B) PMP | 65 | 65 | 65 | 65 | 65 | 65 |
| Compt. (C) C-1 | | | | | | |
| C-1 | — | 2 | 2 | 2 | — | — |
| C-2 | — | — | — | — | 2 | — |
| C-3 | — | — | — | — | — | 2 |
| Compt. (D) D-1 (wt. % based on compt. (C)) | | | | | | |
| D-1 | — | — | — | — | 0.5 | 0.5 |
| D-2 | — | 0.5 | — | — | — | — |
| D-3 | — | — | 0.5 | — | — | — |
| D-4 | — | — | — | 0.5 | — | — |
| Properties of compn. | | | | | | |
| tens. strength [kg/cm$^2$] | 280 | 300 | 290 | 295 | 295 | 295 |
| tens. elongn. [%] | 12 | 13 | 13 | 13 | 13 | 13 |
| Izod impact strength [kgcm/cm] notched | 1.2 | 1.5 | 1.3 | 1.4 | 1.4 | 1.4 |
| appearance of molding (peeling) | peeling | no peeling | no peeling | no peeling | no peeling | no peeling |

Examples 16 to 20 and Comparative Examples 9 to 13

The same procedure as used in Example 8 was repeated except that PMP was replaced with polyethylene (SPE) (Hi-zex 2100J mfd. by Mitsui Petrochemical Industries, Ltd.), polypropylene (PP) (Noprene X101A mfd, by Sumitomo Chemical Co., Ltd.), ethylene/propylene copolymer (EPR) (EP912P mfd. by Japan Synthetic Rubber Co., Ltd.) EPDM resin (EP161SP mfd. by Japan Synthetic Rubber Co., Ltd.) or polybutene-1 (Polybutene M0400 mfd. by Mitsui Petrochemical Industries, Ltd.) each in an amount specified in Table 4.

The results are summarized in Table 4 below.

TABLE 4

| | Comp. Ex. 9 | Ex. 16 | Comp. Ex. 10 | Ex. 17 | Comp. Ex. 11 | Ex. 18 | Comp. Ex. 12 | Ex. 19 | Comp. Ex. 13 | Ex. 20 |
|---|---|---|---|---|---|---|---|---|---|---|
| Amount (pt. by wt.) | | | | | | | | | | |
| Compt. (A) PBT | 70 | 70 | 70 | 70 | 70 | 70 | 70 | 70 | 70 | 70 |
| Compt. (B) | | | | | | | | | | |
| PE | 30 | 30 | — | — | — | — | — | — | — | — |
| PP | — | — | 30 | 30 | — | — | — | — | — | — |
| EPR | — | — | — | — | 30 | 30 | — | — | — | — |
| EPDM | — | — | — | — | — | — | 30 | 30 | — | — |
| polybutene-1 | — | — | — | — | — | — | — | — | 30 | 30 |
| Compt. (C) C-1 | — | 2 | — | 2 | — | 2 | — | 2 | — | 2 |
| Compt. (D) D-1 (wt. % based on compt. (C)) | — | 0.5 | — | 0.5 | — | 0.5 | — | 0.5 | — | 0.5 |
| Properties of compn. | | | | | | | | | | |
| tens. strength [kg/cm$^2$] | 320 | 330 | 395 | 405 | 250 | 260 | 260 | 270 | 270 | 275 |
| tens. elongn. [%] | 11 | 13 | 8 | 9 | 14 | 18 | 15 | 22 | 12 | 14 |
| Izod impact strength [kgcm/cm] notched | 1.5 | 1.8 | 1.2 | 1.5 | 1.8 | 2.6 | 2.0 | 2.9 | 1.6 | 2.2 |
| appearance of molding (peeling) | peeling | no peeling | peeling | no peeling | peeling | no peeling | peeling | no peeling | peeling | no peeling |

While the invention has been described in connection with what is presently considered to he the most practical and preferred embodiment, it is to be understood that the invention is not to be limited to the disclosed embodiment, but on the contrary, is intended to cover various modifications and equivalent arrangements included within the spirit and scope of the appended claims.

What is claimed is:

1. A polyester resin molding composition comprising:
   (A) between 97 to 20 parts by weight, based on 100 parts by weight of the total composition weight, of a polyester base resin;
   (B) between 3 to 80 parts by weight, based on 100 parts by weight of the total composition weight, of a polyolefin resin which is at least one selected from the group consisting of polyethylene, polypropylene, polymethylpentene, polybutylene and copolymers mainly comprised of the same;
   (C) between 0.1 to 15 parts by weight, based on 100 parts by weight of the total composition weight, of a compatibilizing compound which is at least one selected from the group consisting of N-(4-(2,3-epoxypropoxy)3-5-dimethylbenzyl)acrylamides and N-diallylaminoepoxy-propanes; and
   (D) between 0.1 to 20% by weight, based on the weight of the compatibilizing compound, of a free radical initiator.

2. A polyester resin composition as in claim 1, which further comprises (E) up to 120 parts by weight, based on 100 parts by weight of the total composition, of a filler material.

3. A polyester resin composition as in claim 2, wherein the filler material is in the form of fibers, powders, flakes and/or hollow filler materials.

4. A polyester resin composition as in claim 1, wherein said free radical initiator has a one-minute half-life temperature of 130° C. or greater.

5. A polyester resin composition as in claim 1, wherein said free radical initiator is at least one selected from the group consisting of dicumyl peroxide, t-butyl cumyl peroxide, 2,5-dimethylhexane 2,5-dihydroperoxide, di-t-butyl peroxide, t-butyl cumyl peroxide, 2,5-dimethyl-2,5-di(t-butylperoxy) hexane, 2,5-dimethyl-2,5-di(t-butylperoxy)hexyne-3, n-butyl 4,4-bis(t-butylperoxy)valerate, 2,3-diethyl-2,3-diphenylbutane, 2,3-dimethyl-2,3-diphenylbutane, 2,3-dimethyl-2,3-di(P-methylphenyl)bulane and 2,3-dimethyl-2,3-di (bromo-phenyl)butane.

6. A polyester resin composition as in claim 1, wherein said polyester base resin is at least one selected from homopolyesters, copolyesters, halogenated polyesters, and polyester elastomers.

7. A molded article which consists essentially of a polyester resin molding composition as in any one of claims 1-6.

8. A process for making a polyester molding composition which comprises melt-blending the following components:
   (A) between 97 to 20 parts by weight, based on 100 parts by weight of the total composition weight, of a polyester base resin;
   (B) between 3 to 80 parts by weight, based on 100 parts by weight of the total composition weight, of a polyolefin resin;
   (C) between 0.1 to 15 parts by weight, based on 100 parts by weight of the total composition weight of a compatibilizing compound which is at least one selected from the group consisting of N-(4-(2,3-epoxypropoxy)3-5-dimethylbenzyl)acrylamides and N-diallylaminoepoxy-propanes; and
   (D) between 0.1 to 20% by weight, based on the weight of the compatibilizing compound, of a free radical initiator, wherein
   melt-blending is practiced for at least 30 seconds at a temperature of between 5° to 100° C. greater than the melting point of the resin components.

9. A process as in claim 8, which further comprises pre-blending in solution form said compatibilizing compound and said free radical initiator to obtain a solution mixture thereof, and then adding said solution mixture to a melt of said polyester base resin and said polyolefin resin.

10. A process as in claim 8, wherein said melt-blending is practiced for a time period between 1 to 10 minutes.

11. A process as in claim 8, which further comprises (E) up to 120 parts by weight, based on 100 parts by weight of the total composition, of a filler material.

12. A process as in claim 8, wherein the filler material is in the form of fibers, powders, flakes and/or hollow filler materials.

13. A process as in claim 8, wherein said free radical initiator has a one-minute half-life temperature of 130° C. or greater.

14. A process as in claim 13, wherein said free radical initiator is at least one selected from the group consisting of dicumyl peroxide, t-butyl cumyl peroxide, 2,5-dimethylhexane 2,5-dihydroperoxide, di-t-butyl peroxide, t-butyl cumyl peroxide, 2,5-dimethyl-2,5-di(t-butylperoxy) hexane, 2,5-dimethyl-2,5-di(t-butylperoxy)hexyne-3, n-butyl 4,4-bis(t-butylperoxy)valerate, 2,3-diethyl-2,3-diphenylbutane, 2,3-dimethyl-2,3-diphenylbutane, 2,3-dimethyl-2,3-di (P-methylphenyl)bulane and 2,3-dimethyl-2,3-di (bromophenyl)butane.

15. A process as in claim 8, wherein said polyester base resin is at least one selected from homopolyesters, copolyesters, halogenated polyesters, and polyester elastomers.

16. A process as in claim 8, wherein said polyolefin resin is at least one selected from homopolymers or copolymers of polyethylene, polypropylene, polymethylpentene, and polybutylene.

* * * * *